United States Patent
Osumi et al.

[11] Patent Number: 5,976,233
[45] Date of Patent: Nov. 2, 1999

[54] WATER-BASED PIGMENT INK, AND INK-JET RECORDING METHOD AND INSTRUMENTS USING THE SAME

[75] Inventors: Koichi Osumi, Yokohama; Yoshifumi Hattori, Yamato; Yoshihisa Takizawa, Machida; Ryuji Katsuragi, Tokyo; Hisashi Teraoka, Kawasaki, all of Japan

[73] Assignee: Canon Kabushiki Kaisha, Tokyo, Japan

[21] Appl. No.: 08/966,521

[22] Filed: Nov. 10, 1997

[30] Foreign Application Priority Data

Nov. 13, 1996 [JP] Japan ................................. 8-315673

[51] Int. Cl.⁶ ................................................ C09D 11/02
[52] U.S. Cl. .................................... 106/31.86; 106/31.75; 106/31.77
[58] Field of Search .......................... 106/31.86, 31.75, 106/31.77

[56] References Cited

U.S. PATENT DOCUMENTS

| | | | |
|---|---|---|---|
| 5,169,437 | 12/1992 | You ....................................... | 106/31.58 |
| 5,356,464 | 10/1994 | Hickman et al. ..................... | 106/31.58 |
| 5,571,311 | 11/1996 | Belmont et al. ..................... | 106/31.43 |
| 5,746,818 | 5/1998 | Yatake ................................. | 106/31.86 |
| 5,762,695 | 6/1998 | Wong et al. ......................... | 106/31.89 |

FOREIGN PATENT DOCUMENTS

| | | |
|---|---|---|
| 0 098 338 A1 | 1/1984 | European Pat. Off. . |
| 0 441 987 A2 | 8/1991 | European Pat. Off. . |
| 0 688 836 A2 | 12/1995 | European Pat. Off. . |
| 0 761 783 A2 | 3/1997 | European Pat. Off. . |
| 5-186704 | 7/1993 | Japan . |
| 8-3498 | 1/1996 | Japan . |

Primary Examiner—Helene Klemanski
Attorney, Agent, or Firm—Fitzpatrick, Cella, Harper & Scinto

[57] ABSTRACT

Disclosed herein is a water-based pigment ink comprising a coloring material composed of self-dispersing carbon black obtained by bonding at least one hydrophilic group directly or through another atomic group to the surface of carbon black, a humectant of the general formula $$H-(CH_2)_m-C-((CH_2)_nOH)_3$$

wherein m and n are independently an integer of from 1 to 5, and an aqueous medium composed of water and a water-soluble organic solvent.

27 Claims, 3 Drawing Sheets

WATER-BASED PIGMENT INK, AND INK-JET RECORDING METHOD AND INSTRUMENTS USING THE SAME

BACKGROUND OF THE INVENTION

1. Field of the Invention

The present invention relates to water-based pigment inks, and particularly to water-based pigment inks containing self-dispersing carbon black as a pigment. The present invention also relates to an ink-jet recording method comprising applying such an ink to conduct recording, and ink-jet instruments using such an ink.

2. Related Background Art

As a black colorant for printing inks, carbon black, which is excellent in fastness properties such as water fastness and light fastness, has heretofore been widely used. In order to use carbon black as a coloring material for a water-based ink, it is however necessary to stably disperse the carbon black in an aqueous medium. Since the carbon black generally has poor dispersibility, a dispersing agent is added to an aqueous medium so as to stably disperse the carbon black therein for the purpose of obtaining a homogeneous dispersion system. However, even the method of using the dispersing agent cannot achieve satisfactory dispersibility. Therefore, any ink in which the carbon black is dispersed has involved a special problem that its long-term storage stability is poor.

When an ink is used in ink-jet recording on the other hand, it is generally necessary to eject the ink in the form of stable droplets through a minute orifice of an ink-jet recording head. Therefore, the ink is required to prevent the occurrence of solidification and the like of the ink due to its drying in the orifice of the ink-jet recording head. When the above-described ink containing the dispersing agent is used in ink-jet recording, however, clogging at an orifice and failure in ejection of ink droplets may occur in some cases because a resin composing the dispersing agent is not redissolved in the ink after adhesion to the orifice and the like. Besides, the water-based pigment ink containing the dispersing agent is viscous and hence has involved a problem that it meets with resistance in the course leading to the orifice when conducting continuous ejection and high-speed printing, so that its ejection becomes unstable, and difficulty is encountered on smooth recording.

In order to solve the above problem on the other hand, there has been developed self-dispersing carbon black capable of stably dispersing without using any dispersing agent by introducing a water-soluble group in the surface of carbon black as described in Japanese Patent Application Laid-Open Nos. 5-186704 and 8-3498.

SUMMARY OF THE INVENTION

The present inventors have found that when such self-dispersing carbon black is used as a coloring material in an ink for ink-jet recording, first ejection disorder or failure of ejection may occur in some cases when ejection of the ink through a nozzle corresponding to a blank is suspended in the course of recording of a document or image having blanks, and then resumed.

Further, it has been known that when the ink is continuously ejected through one and the same nozzle over a long period of time, the impact accuracy of the ink ejected on a recording medium becomes poor.

Accordingly, it is an object of the present invention to provide water-based pigment inks which can solve the above-described problems involved in the prior art, have excellent long-term storage stability, cause no clogging at an orifice when applied to, in particular, ink-jet recording, and are excellent in ink ejection stability (which hereinafter may be referred to as "intermittent ejection stability") after suspension of ejection, and ejection stability (which hereinafter may be referred to as "ejection durability") in long-time continuous ejection that when the ink is continuously ejected through one and the same nozzle over a long period of time, the impact accuracy of the ink ejected on a recording medium is kept good.

Another object of the present invention is to provide an ink-jet recording method and ink-jet instruments capable of stably recording high-quality images having high fastness properties by applying the above water-based pigment inks.

The above objects can be achieved by the present invention described below.

According to the present invention, there is thus provided a water-based pigment ink comprising a coloring material composed of self-dispersing carbon black obtained by bonding at least one hydrophilic group directly or through another group to the surface of carbon black, a humectant of the general formula wherein m and n are independently an integer of from 1 to 5, and an aqueous medium composed of water and a water-soluble organic solvent.

According to the present invention, there is also provided a water-based pigment ink comprising a coloring material composed of self-dispersing carbon black obtained by bonding at least one hydrophilic group through an alkylene group having 1 to 12 carbon atoms, a phenylene group which may be substituted, or a naphthylene group which may be substituted, to the surface of carbon black, trimethylolpropane, and an aqueous medium composed of water and a water-soluble organic solvent.

According to the present invention, there is further provided an ink-jet recording method comprising applying an ink by an ink-jet system to a recording medium to conduct recording, wherein any one of the water-based pigment inks described above is used as said ink.

According to the present invention, there is still further provided a recording unit comprising an ink container portion with an ink held therein and a head from which the ink is ejected, wherein any one of the water-based pigment inks described above is used as said ink.

According to the present invention, there is yet still further provided an ink cartridge comprising an ink container portion with an ink held therein, wherein any one of the water-based pigment inks described above is used as said ink.

According to the present invention, there is yet still further provided an ink-jet recording apparatus comprising a recording unit having an ink container portion with an ink held therein and a head from which the ink is ejected, wherein any one of the water-based pigment inks described above is used as said ink.

According to the present invention, there is yet still further provided an ink-jet recording apparatus comprising an ink cartridge having an ink container portion with an ink held therein and a head from which the ink is ejected, wherein any one of the water-based pigment inks described above is used as said ink.

According to the present invention, there is yet still further provided a method of improving the impact accuracy of an ink ejected, which comprises the step of applying any one of the water-based pigment inks described above to a recording medium by an ink-jet system.

DESCRIPTION OF THE PREFERRED EMBODIMENTS

The present invention will hereinafter be described in detail by preferred embodiments of the invention.

The pigment inks according to the present invention comprises a coloring material, an aqueous medium and a humectant, and preferably further comprises a specific surfactant. The individual materials composing the pigment inks according to the present invention will hereinafter be described.

First of all, as the coloring material, there is used self-dispersing carbon black obtained by bonding at least one hydrophilic group directly or through an another atomic group to the surface of carbon black. As a result, there is no need to use a dispersing agent used for dispersing carbon black like the conventional pigment inks. The self-dispersing carbon black used in the present invention preferably has an ionicity, and those charged anionically or cationically are preferred.

Examples of the hydrophilic group bonded to the surface of the anionically charged carbon black include —COOM, —$SO_3M$, —$PO_3HM$, —$PO_3M_2$, —$SO_2NH_2$ and —$SO_2NHCOR$, wherein M is hydrogen, alkali metal, ammonium or organic ammonium, R is an alkyl group having 1 to 12 carbon atoms, a phenyl group which may be substituted, or a naphthyl group which may be substituted. Of these, carbon black with —COOM or —$SO_3M$ bonded to the surface thereof is preferably used in the present invention.

With respect to "M" in the above-described hydrophilic groups, examples of the alkali metal include lithium, sodium and potassium, and examples of the organic ammonium include mono-, di- and trimethylammonium, mono-, di- and triethylammonium, and mono-, di- and trimethylolammonium. As a method for obtaining the anionically charged carbon black, an example of a method for introducing —COONa in the surface of carbon black includes a method in which carbon black is subjected to an oxidation treatment with sodium hypochlorite. It goes without saying that the present invention is not limited to this method.

Preferable examples of the hydrophilic group bonded to the surface of the cationically charged carbon black include quaternary ammonium groups, with the following quaternary ammonium groups being more preferred. Carbon black with any of these groups bonded to the surface thereof is preferably used as the coloring material in the present invention.

As a method for producing the cationic self-dispersing carbon black with such a hydrophilic group as described above bonded to the surface thereof, a method for bonding, for example, an N-ethylpyridyl group of the structure described below to the surface of carbon black includes a method in which carbon black is treated with 3-amino-N-ethylpyridinium bromide. It goes without saying that the present invention is not limited to this method.

In the present invention, it is also preferable to bond such a hydrophilic group as mentioned above through another atomic group to the surface of carbon black. Examples of the other group include alkylene groups having 1 to 12 carbon atoms, a phenylene group which may be substituted, and a naphthylene group which may be substituted. Specific examples of the case where the hydrophilic group is bonded through another group to the surface of carbon black include —$C_2H_4$COOM, -phenylene—$SO_3M$ and —$C_5H_{10}NH_3^+$. It goes without saying that the present invention is not limited to these cases.

Since the self-dispersing carbon black used in the water-based pigment inks according to the present invention are cationically or anionically charged with the hydrophilic group bonded to the surface thereof, it has good dispersibility in water by virtue of repulsion of the ion thereof, and its hydrophilicity is also enhanced by the hydrophilic group. Therefore, a water-based pigment ink in which a pigment, i.e., the self-dispersing carbon black, is stably dispersed in an aqueous medium without increasing the particle size of the pigment and the viscosity of the ink even when stored for a long period of timer is obtained.

In the present invention, the self-dispersing carbon black is not limited to one kind, and two of more kinds of such carbon black may be used in combination to control the color tone of the ink. The amount of the self-dispersing carbon black to be added in the pigment inks according to the present invention is preferably within a range of from 0.1 to 15% by weight, more preferably from 1 to 10% by weight, based on the total weight of each ink. In addition to the self-dispersing carbon black, a dye may be used to control the color tone of the inks.

A feature of the pigment inks according to the present invention resides in that a specific humectant is contained together with the above self-dispersing carbon black used as a coloring material. More specifically, urea is added as a humectant in the conventional ink-jet recording inks for the purpose of preventing the solidification of the inks due to their drying in an orifice of an ink-jet recording head, thereby preventing the occurrence of clogging at the orifice and ejection failure of the inks. It has however been found that the addition of urea to a water-based pigment ink using the self-dispersing carbon black causes a problem that the dispersibility of the self-dispersing carbon black is deteriorated by the urea when the ink is stored for a long period of time.

In order to solve this problem, the present inventors have carried out an extensive investigation as to humectants which have good compatibility with the self-dispersing carbon black and can improve the intermittent ejection stability of a water-based pigment ink containing the self-dispersing carbon black. As a result, it has been found that when a humectant represented by the above-described general formula is used, clogging at an orifice with the resulting ink can be prevented, and the ejection stability of the ink, in particular, the intermittent ejection stability and ejection durability can be markedly improved.

As the humectant used in the water-based pigment inks according to the present invention, there may be used compounds represented of the formula wherein m and n are independently an integer of from 1 to 5.

Of these, trimethylolpropane is particularly preferred in the present invention. More specifically, trimethylolpropane has excellent compatibility with the self-dispersing carbon black, and so it has a far excellent effect for the long-term storage stability and intermittent ejection stability when trimethylolpropane is contained in the ink. The amount of such a humectant to be added is preferably within a range of from 1 to 30% by weight, more preferably from 1 to 10% by weight, based on the total weight of the water-based pigment ink.

When a specific surfactant is further contained in addition to the humectant in the water-based pigment inks according to the present invention, the ejection stability and fixing ability to recording media of the pigment inks can be more improved.

As the surfactant contained in the water-based pigment inks according to the present invention, there may be used, for example, cationic surfactants such as quaternary ammonium salts, for example, tetradecylammonium sulfate, and nonionic surfactants such as an ethylene oxide adduct (n=11) of lauryl alcohol, an ethylene oxide adduct (n=11) of nonylphenol, and ethylene oxide adducts of acetylene glycol.

Examples of the nonionic surfactant are the compounds of the formulae (1) to (4)

wherein R is an alkyl group, and n is an integer;

wherein R is an alkyl group, and n is an integer;

wherein R is hydrogen or an alkyl group, and m and n are independently an integer; and wherein m and n are independently an integer (Acetylenol EH).

When the surfactant is added to the water-based pigment ink according to the present invention, it is desirable that the content thereof be within a range of preferably from 0.01 to 5.0% by weight, more preferably from 0.1 to 0.3% by weight, based on the total weight of the water-based pigment ink. If the content is lower than 0.01% by weight, the penetrability of the resulting ink into recording media generally becomes too low, and so the effect of improving the fixing ability of the ink to the recording media is hard to bring about. In addition, the effect of improving the ejection stability of the ink is also hard to bring about. If the content is higher than 5.0% by weight on the other hand, the resulting ink may not be suitable for an ink in some cases because the quality of a print obtained by printing with such an ink becomes deteriorated.

When the water-based pigment ink according to the present invention is used in ink-jet recording, it is desirable that the amount of the surfactant to be added be determined in such a manner that the surface tension of the resulting ink is at least 30 dyn/cm. When the surface tension of the ink is lower than 30 dyn/cm in the ink-jet recording system, there is a possibility that printing slippage (deviation of ink-droplet impact) and the like may occur due to wetting at an orifice.

The aqueous medium contained in the water-based pigment inks according to the present invention is composed of water and a water-soluble organic solvent. Specific examples of the water-soluble organic solvent used in the present invention include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; polyalkylene glycols such as polyethylene glycol and polypropylene glycol; alkylene glycols the alkylene moiety of which has 2 to 6 carbon atoms, such as ethylene glycol, propylene glycol, trimethylene glycol and triethylene glycol; 1,2,6-hexanetriol; glycerol; trimethylolethane, trimethylolpropane; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. The water-soluble organic solvents mentioned above may be used either singly or in any combination thereof.

No particular limitation is imposed on the content of such water-soluble organic solvents as mentioned above contained in the water-based pigment inks according to the present invention. However, it is preferably within a range of from 3 to 50% by weight based on the total weight of each ink. On the other hand, the content of water contained in the inks is preferably within a range of from 50 to 95% by weight based on the total weight of each ink.

When trimethylolpropane is used, a ratio of the above water-soluble organic solvents to trimethylolpropane is preferably within a range of from 5:1 to 1:2.

Further, the water-based pigment inks according to the present invention may contain, in addition to the above-described components, antifoaming agents, antiseptics, mildewproofing agents and the like, as needed, to provide them as inks having desired physical properties. Furthermore, commercially-available water-soluble dyes and/or the like may be added.

As described above, the water-based pigment inks according to the present invention are particularly effective upon use in ink-jet recording. Ink-jet recording methods include a recording method in which mechanical energy is applied to an ink to eject droplets of the ink, and a recording method in which thermal energy is applied to an ink to form bubbles in the ink, thereby ejecting droplets of the ink. The water-based pigment inks according to the present invention are particularly suitable for use in these recording methods.

Illustrative ink-jet recording apparatus according to the present invention, which are suitable for use in conducting recording with the above-described water-based pigment inks according to the present invention, will hereinafter be described.

Figure 1:
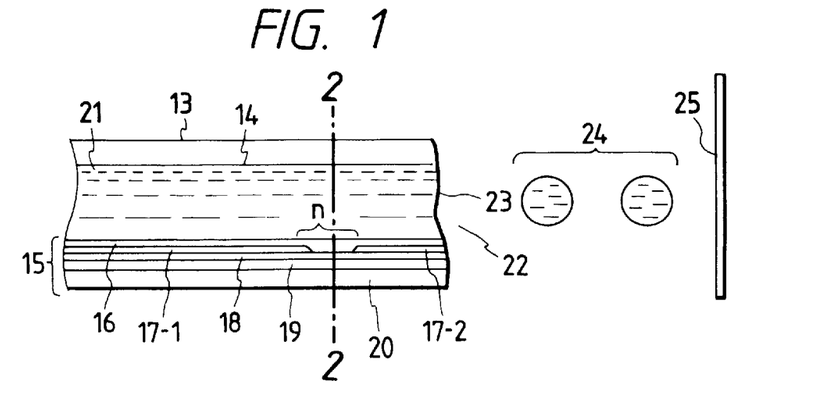
FIG. 1 is a longitudinal cross-sectional view illustrating an exemplary head of an ink-jet recording apparatus.
Figure 2:
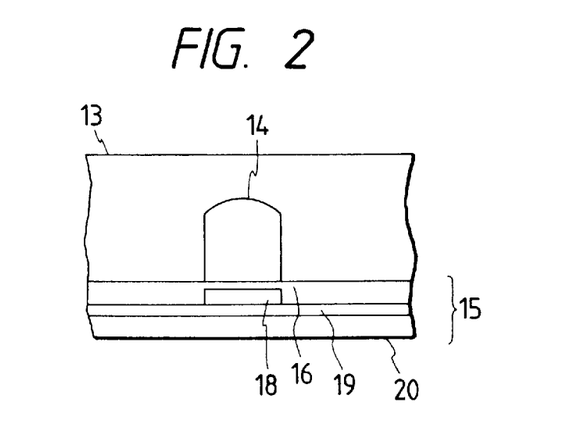
FIG. 2 is a transverse cross-sectional view of the head of the ink-jet recording apparatus.

An example of the construction of a head, which is a main component of an ink-jet recording apparatus making good use of thermal energy, is first illustrated in FIGS. 1 and 2.

FIG. 1 is a cross-sectional view of a head 13 taken along the flow path of an ink, and FIG. 2 is a cross-sectional view taken along line 2—2 in FIG. 1. The head 13 is formed by bonding a glass, ceramic, silicon or plastic plate or the like having a flow path (nozzle) 14 through which the ink is passed, to a heating element base 15. The heating element base 15 is composed of a protective layer 16 formed with silicon oxide, silicon nitride, silicon carbide or the like, electrodes 17-1 and 17-2 made of aluminum, gold, aluminum-copper alloy or the like, a heating resistor layer 18 formed with a high-melting material such as $HfB_2$, TaN or TaAl, a heat accumulating layer 19 formed with thermally oxidized silicon, aluminum oxide or the like, and a substrate 20 made of silicon, aluminum, aluminum nitride or the like having good heat radiating property.

Upon application of electric pulse signals to the electrodes 17-1 and 17-2 in the head 13, the heating element base 15 rapidly generates heat at the region shown by n to form bubbles in the ink 21 which is in contact with the surface of this region. A meniscus 23 of the ink 21 is projected by the action of the pressure thus produced, and the ink 21 is ejected through the nozzle 14 of the head to fly out of an ejection orifice 22 toward a recording medium 25 in the form of ink droplets 24.

Figure 3:
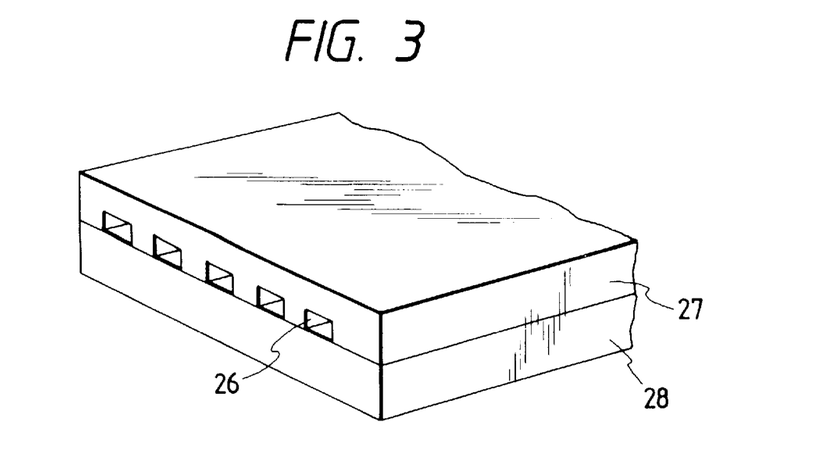
FIG. 3 is a perspective view of the appearance of a multi-head which is an array of such heads as shown in FIG. 1.

FIG. 3 illustrates an appearance of a multi-head composed of an array of a number of heads as shown in FIG. 1. The multi-head is formed by bonding a glass plate 27 having a number of nozzles 26 to a heating head 28 similar to the head as illustrated in FIG. 1.

Figure 4:
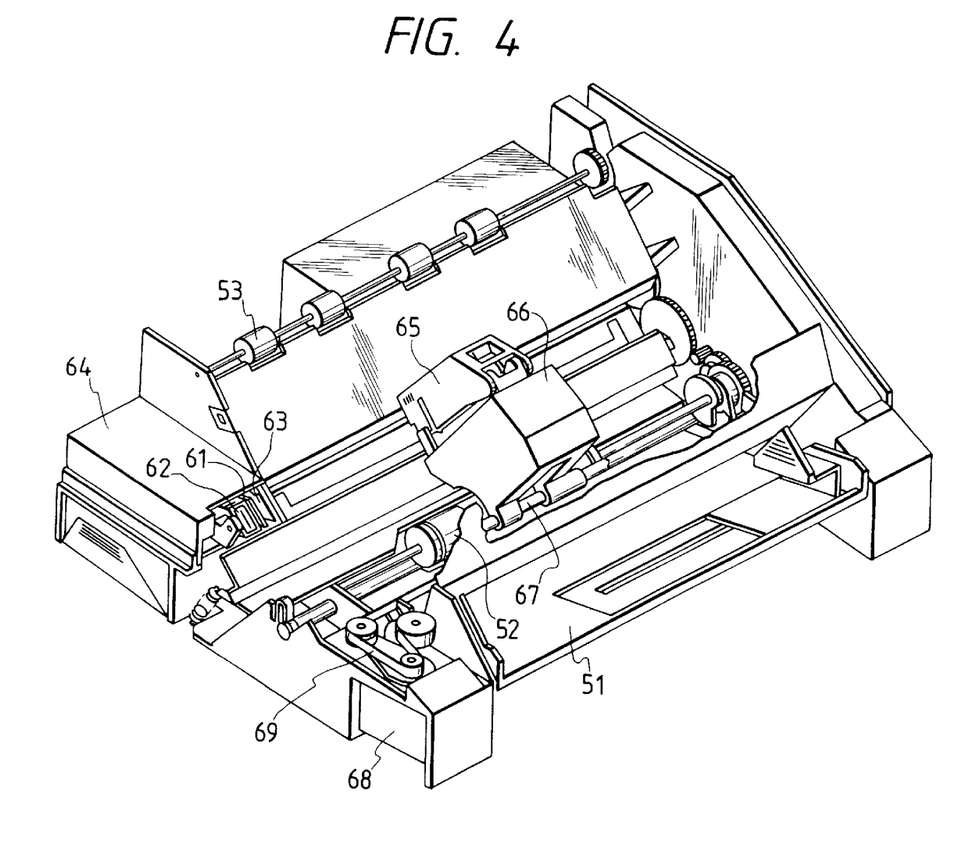
FIG. 4 is a schematic perspective view illustrating an exemplary ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap for the face of ejection openings of the recording head 65, which is provided at the home position adjacent to the blade 61, and is so constituted that it moves in the direction perpendicular to the direction in which the recording head 65 is moved and comes into contact with the face of the ejection openings to cap it. Reference numeral 63 denotes an ink-absorbing member provided adjoiningly to the blade 61 and, similar to the blade 61, held in such a form that it protrudes into the course through which the recording head 65 is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording media are separately inserted, and paper feed rollers driven by a motor (not illustrated), respectively. With such a construction, the recording medium is fed to the position opposite to the ejection opening face of the recording head 65, and discharged from a paper discharge section provided with paper discharge rollers 53 with the progress of recording. In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped.

When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
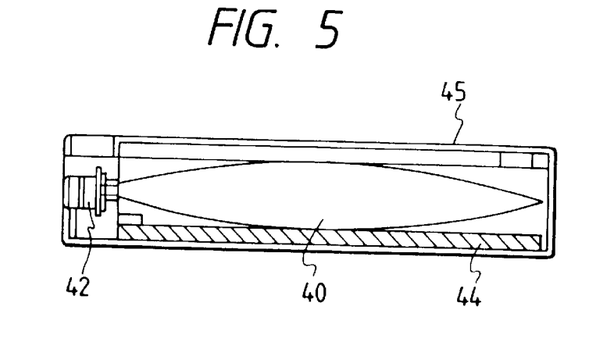
FIG. 5 is a longitudinal cross-sectional view illustrating an exemplary ink cartridge.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink.

It is preferred that the ink container portion be formed of a polyolefin, in particular, polyethylene, at its surface with which the ink comes into contact.

Figure 6:
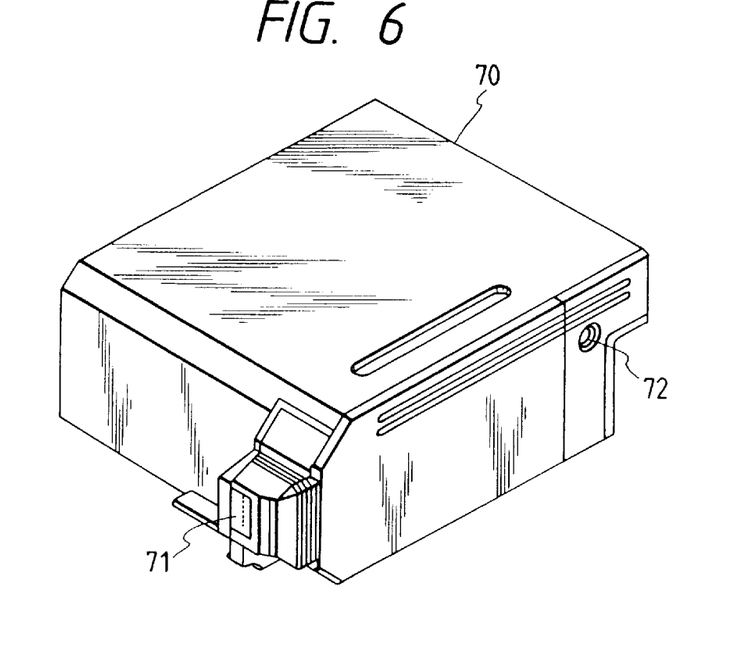
FIG. 6 is a perspective view illustrating an exemplary printing unit.

The ink-jet recording apparatus used in the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane is preferably used as a material for the ink-absorbing member.

The recording unit 70 may be so constructed that the ink container portion is a bag for the ink in the interior of which a spring or the like is provided, not the ink-absorbing member.

Reference numeral 72 indicates an air passage for communicating the interior of the recording unit 70 with the atmosphere. This recording unit 70 can be used in place of the recording head 65 shown in FIG. 4, and is detachably installed on the carriage 66.

As a preferable example of an ink-jet recording apparatus making good use of mechanical energy, may be mentioned an On-Demand type ink-jet recording apparatus comprising a nozzle-forming base having a plurality of nozzles, pressure-generating elements composed of a piezoelectric material and an electric conductive material provided in an opposing relation to the nozzles, and a recording head charged with an ink filled around the pressure-generating elements to eject droplets of the ink from the nozzles by displacing the pressure-generating elements by voltage application. An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 undergoing displacement according to an electric signal, and a substrate 84 adapted to support and fix the orifice plate 81, the vibration plate 82 and the like thereon.

Figure 7:
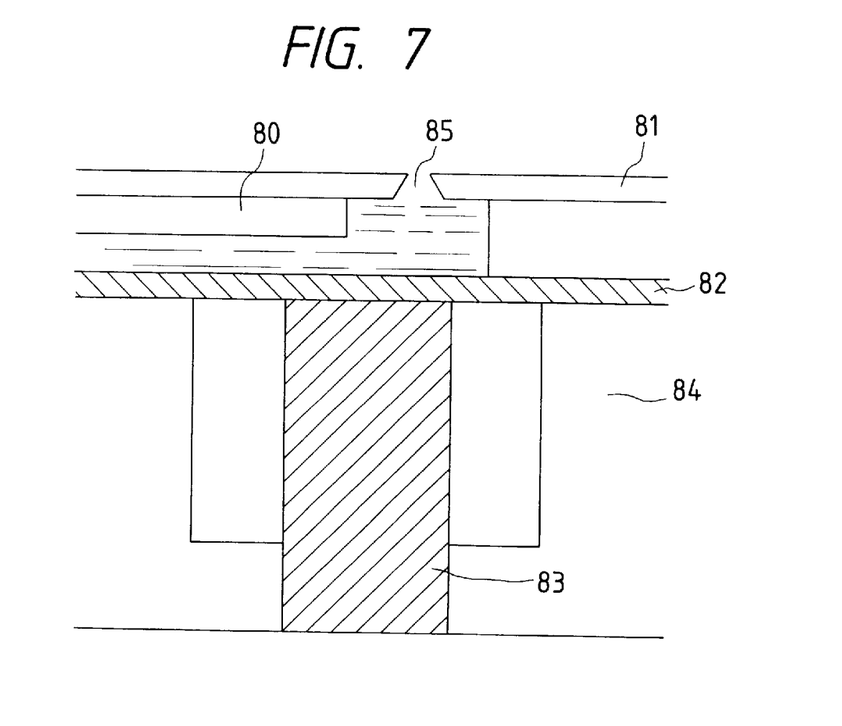
FIG. 7 is a schematic cross-sectional view illustrating the construction of another exemplary ink-jet recording head.

In FIG. 7, the ink flow path 80 is formed with a photosensitive resin or the like. The orifice plate 81 is made of a metal such as stainless steel or nickel, the ejection opening 85 of which is defined by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above construction is operated in such a manner that pulsed voltage is applied to the piezoelectric element 83 to generate a stress to cause distortion, the vibration plate 82 bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording.

Such a recording head is used by incorporating it into an ink-jet recording apparatus similar to that illustrated in FIG. 4. Operation of details of the ink-jet recording apparatus may be conducted in the same manner as described above.

The present invention will hereinafter be described more specifically by the following Examples and Comparative Example. However, the present invention is not limited to and by these examples so far as the subject matter of the present invention is not overstepped. Incidentally, all designations of "part" or "parts" and "%" as will be used in the following examples mean part or parts by weight and % by weight unless expressly noted.

Pigment Dispersion 1

After 300 g of commercially-available acid carbon black ("MA-77", trade name; pH: 3.0; product of Mitsubishi Chemical Industries Limited) were thoroughly mixed with 1,000 ml of water, 450 g of sodium hypochlorite (available chlorine concentration: 12%) were added dropwise to the mixture, followed by stirring for 10 hours at 100 to 105° C. The resultant slurry was filtered through Toyo Filter Paper No. 2 (product of Advantes Co.) and the resultant pigment particles were fully washed with water. The wet cake of this pigment was dispersed again in 3,000 ml of water, and the dispersion was desalted by means of a reverse osmosis membrane to a conductivity of 0.2 $\mu$s. The pigment dispersion (pH: 8 to 10) was concentrated to a pigment concentration of 10%. The above-described process was followed to introduce a group —COO$^-$ in the surface of the carbon black.

Pigment Dispersion 2

After 10 g of carbon black having a surface area of 230 $m^2/g$ and a DBP oil absorption of 70 ml/100 g and 3.41 g of p-aminobenzoic acid were thoroughly mixed with 72 g of water, 1.62 g of nitric acid were added dropwise to the mixture, followed by stirring at 70° C. After several minutes, a solution of 1.07 g of sodium nitrite in 5 g of water was further added to the mixture, and the resultant mixture was stirred for an additional 1 hour. The resultant slurry was filtered through Toyo Filter Paper No. 2 (product of Advantes Co.), and the resultant pigment particles were fully washed with water and dried in an oven controlled to 90° C. Water was added to the dried pigment to prepare an aqueous dispersion of the pigment having a pigment concentration of 10%. The above-described process was followed to introduce a group of the formula in the surface of the carbon black.

Pigment Dispersion 3

To a solution of 5 g of concentrated hydrochloric acid and 5.3 g of water were added 1.58 g of anthranilic acid at 5° C. The mixture was stirred in an ice bath, thereby always holding it at 10° C. or lower. In this state, a solution of 1.78 g of sodium nitrite dissolved in 8.7 g of water at 5° C. was added. After 15 minutes, 20 g of carbon black having a surface area of 320 $m^2/g$ and a DBP oil absorption of 120 ml/100 g were mixed with the resultant mixture with stirring. The resultant mixture was stirred for an additional 15 minutes. The resultant slurry was filtered through Toyo Filter Paper No. 2 (product of Advantes Co.), and the resultant pigment particles were fully washed with water and dried in an oven controlled to 110° C. Water was added to the dried pigment to prepare an aqueous dispersion of the pigment having a pigment concentration of 10%. The above-described process was followed to introduce a group of the formula in the surface of the carbon black.

Pigment Dispersion 4

After 10 g of carbon black having a surface area of 230 $m^2/g$ and a DBP oil absorption of 70 ml/100 g and 3.06 g of 3-amino-N-ethylpyridinium bromide were thoroughly mixed with 72 g of water, 1.62 g of nitric acid were added dropwise to the mixture, followed by stirring at 70° C. After several minutes, a solution of 1.07 g of sodium nitrite dissolved in 5 g of water was further added to the mixture, and the resultant mixture was stirred for an additional 1 hour. The resultant slurry was filtered through Toyo Filter Paper No. 2 (product of Advantes Co.), and the resultant pigment particles were fully washed with water and dried in an oven controlled to 110° C. Water was added to the dried pigment to prepare an aqueous dispersion of the pigment having a pigment concentration of 10%. The above-described process was followed to introduce a group of the formula in the surface of the carbon black.

Example 1

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 1 described above | 30 parts |
| Trimethylolpropane | 6 parts |
| Glycerol | 6 parts |
| Diethylene glycol | 6 parts |
| Water | 52 parts. |

Example 2

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 2 described above | 30 parts |
| Trimethylolpropane | 6 parts |
| Ethylene oxide adduct of acetylene glycol (Acetylenol EH, trade name) | 0.15 parts |
| Glycerol | 5 parts |
| Ethylene glycol | 5 parts |
| Water | 53.85 parts. |

Example 3

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 2 described above | 30 parts |
| Trimethylolpropane | 6 parts |
| Glycerol | 6 parts |
| Ethylene glycol | 6 parts |
| Water | 52 parts. |

Example 4

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 3 described above | 30 parts |
| Trimethylolpropane | 6 parts |
| Sodium tetradecyl sulfate | 0.1 parts |
| Glycerol | 6 parts |
| Thiodiglycol | 6 parts |
| Water | 51.9 parts. |

Example 5

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| Pigment Dispersion 4 described above | 30 parts |
| --- | --- |
| Trimethylolpropane | 6 parts |
| Ethylene oxide adduct of acetylene glycol (Acetylenol EH, trade name) | 0.15 parts |
| Glycerol | 5 parts |
| Diethylene glycol | 5 parts |
| Water | 53.85 parts. |

Example 6

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| Pigment Dispersion 3 described above | 30 parts |
| --- | --- |
| Trimethylolpropane | 2 parts |
| Acetylenol EH | 0.1 parts |
| Glycerol | 6 parts |
| Thiodiglycol | 6 parts |
| Water | 55.9 parts. |

Example 7

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| Pigment Dispersion 3 described above | 30 parts |
| --- | --- |
| Trimethylolpropane | 10 parts |
| Acetylenol EH | 0.1 parts |
| Glycerol | 6 parts |
| Diethylene glycol | 6 parts |
| Water | 47.9 parts. |

Comparative Example 1

The following components were mixed and thoroughly stirred into a solution. The resultant solution was then filtered under pressure through a microfilter (product of Fuji Photo Film Co., Ltd.) having a pore size of 3.0 μm, thereby preparing a comparative ink.

| Pigment Dispersion 1 described above | 30 parts |
| --- | --- |
| Ethyl alcohol | 6 parts |
| 2-Methylpyrrolidone | 6 parts |
| Water | 58 parts. |

The main features of the black inks obtained in Examples 1 to 7 and Comparative Example 1 are shown collectively in Table 1.

Each of the black inks obtained in Examples 1 to 7 and Comparative Example 1 was used to evaluate it as to the following properties by means of an ink-jet recording apparatus (BJC-4000, trade name, manufactured by Canon Inc.) having an On-Demand type multi-recording head, which ejects an ink by applying thermal energy according to recording signals to the ink. The results are shown in Table 2.

1) Intermittent Ejection Stability

When an intermittent operation consisting of (1) continuous ejection for 10 seconds, (2) suspension of ejection for a predetermined period of time and (3) resumption of continuous ejection is conducted, whether the disorder of ejecting direction occurs or not at the beginning of the resumption of ejection is determined by the length of the suspension time in step (2). Therefore, this suspension time was varied by stages, thereby determining the intermittent ejection stability to rank it in accordance with the following standard. Incidentally, this operation was performed under environmental conditions of a temperature of 15° C. and a humidity of 10%.

A: The ink was stably ejected even after being suspended for 31 seconds or longer;

B: The ink was stably ejected even after being suspended for 21 to 30 seconds; and C: The ink was stably ejected only if the suspension time was not longer than 20 seconds.

2) Ejection Durability

Each of the inks was subjected to a 100-hour continuous printing test at 25° C. to observe whether deviation of ink-droplet impact, ejection failure and the like occurred or not, thereby ranking it in accordance with the following standard:

A: Neither deviation of ink-droplet impact nor ejection failure was observed;

B: Deviation of ink-droplet impact was observed for the ink ejected from one or two nozzles capable of recovering ejection by suction, but no ejection failure was observed; and C: Both deviation of ink-droplet impact and ejection failure were observed.

3) Storage Stability

In a 100-ml glass bottle (product of Shot Co.) were placed 100 ml of each of the inks, and the bottle was left standing for 3 months in a thermostatic chamber controlled to 60° C. Thereafter, the bottle was stood with the cap of the bottle down to evaluate the ink as to the storage stability by visually observing the amount and size of a deposit (a pimple-like matter) on the bottom of the bottle and rank it in accordance with the following standard:

A: a pimple-like matter scarcely occurred;

B: a pimple-like matter occurred; and

C: a pimple-like matter occurred to a great extent.

TABLE 1

Main features of black inks of Examples 1 to 7 and Comparative Example 1

| | Another atomic group interposing between surface of self-dispersing carbon black and hydrophilic group | Hydrophilic group bonded to surface of self-dispersing carbon black | Humectant | Surfactant |
|---|---|---|---|---|
| Ex. 1 | Not interposed | —COO⁻ | Trimethylolpropane | Not added |
| Ex. 2 | –⟨phenylene⟩– | —SO₃⁻ | Trimethylolpropane | Acetylenol EH |
| Ex. 3 | –⟨phenylene⟩– | —SO₃⁻ | Trimethylolpropane | Not added |
| Ex. 4 | –⟨phenylene⟩– | —COO⁻ | Trimethylolpropane | tetradecyl-ammonium sulfate |
| Ex. 5 | Not interposed | –⟨pyridinium–N⁺–C₂H₅⟩ | Trimethylolpropane | Acetylenol EH |
| Ex. 6 | –⟨phenylene⟩– | —COO⁻ | Trimethylolpropane | Acetylenol EH |
| Ex. 7 | –⟨phenylene⟩– | —COO⁻ | Trimethylolpropane | Acetylenol EH |
| Comp. Ex. 1 | Not interposed | —COO⁻ | Not added | Not added |

TABLE 2

| | Intermittent ejection stability | Ejection durability | Storage stability |
|---|---|---|---|
| Example 1 | A | A | A |
| Example 2 | A | A | A |
| Example 3 | A | B | A |
| Example 4 | A | A | A |
| Example 5 | B | A | A |
| Example 6 | A | B | A |
| Example 7 | A | A | A |
| Comparative Example 1 | C | C | A |

According to the present invention, as described above, there can be provided water-based pigment inks having excellent long-term storage stability, intermittent ejection stability, ejection durability and anti-clogging property at an orifice.

According to the present invention, there can be provided water-based pigment inks having far excellent intermittent stability and ejection durability, and an ink-jet recording method and ink-jet recording apparatus capable of stably recording high-quality images which have a high image density and are high in fastness properties such as light fastness and water fastness.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A water-based pigment ink comprising a coloring material composed of self-dispersing carbon black obtained by bonding at least one hydrophilic group through another atomic group to the surface of carbon black, a humectant of the general formula wherein m and n are independently an integer of 1 to 5, and an aqueous medium composed of water and a water-soluble organic solvent.

2. A water-based pigment ink comprising a coloring material composed of self-dispersing carbon black obtained by bonding at least one hydrophilic group through an alkylene group having 1 to 12 carbon atoms, a phenylene group which may be substituted, or a naphthylene group which may be substituted, to the surface of carbon black, trimethylolpropane, and an aqueous medium composed of water and a water-soluble organic solvent.

3. The water-based pigment ink according to claim 1, wherein the hydrophilic group is at least one selected from the group consisting of the residues:

wherein M is hydrogen, alkali metal, ammonium or organic ammonium, R is an alkyl group having 1 to 12 carbon atoms, a phenyl group which may be substituted, or a naphthyl group which may be substituted.

4. The water-based pigment ink according to claim 2, wherein the hydrophilic group is at least one selected from the group consisting of the residues:

-continued wherein M is hydrogen, alkali metal, ammonium or organic ammonium, R is an alkyl group having 1 to 12 carbon atoms, a phenyl group which may be substituted, or a naphthyl group which may be substituted.

5. The water-based pigment ink according to claim 1, wherein the hydrophilic group is a basic group.

6. The water-based pigment ink according to claim 2, wherein the hydrophilic group is a basic group.

7. The water-based pigment ink according to claim 1, wherein the coloring material is contained in an amount ranging from 0.1 to 15% by weight based on the total weight of the ink.

8. The water-based pigment ink according to claim 2, wherein the coloring material is contained in an amount ranging from 0.1 to 15% by weight based on the total weight of the ink.

9. The water-based pigment ink according to claim 1, wherein the coloring material is contained in an amount ranging from 1 to 10% by weight based on the total weight of the ink.

10. The water-based pigment ink according to claim 2, wherein the coloring material is contained in an amount ranging from 1 to 10% by weight based on the total weight of the ink.

11. The water-based pigment ink according to claim 1, wherein the humectant is contained in an amount ranging from 1 to 30% by weight based on the total weight of the ink.

12. The water-based pigment ink according to claim 1, wherein the humectant is contained in an amount ranging from 1 to 10% by weight based on the total weight of the ink.

13. The water-based pigment ink according to claim 2, wherein the trimethylolpropane is contained in an amount ranging from 1 to 30% by weight based on the total weight of the ink.

14. The water-based pigment ink according to claim 2, wherein the trimethylolpropane is contained in an amount ranging from 1 to 10% by weight based on the total weight of the ink.

15. The water-based pigment ink according to claim 1, which further comprises at least one surfactant selected from the group consisting of surfactants of the formulae (1) to (4)

wherein R is an alkyl group, and n is an integer;

wherein R is an alkyl group, and n is an integer;

(3)

wherein R is hydrogen or an alkyl group, and m and n are independently an integer; and

(4)

wherein m and n are independently an integer.

16. The water-based pigment ink according to claim 2, which further comprises at least one surfactant selected from the group consisting of surfactants of the formulae (1) to (4)

(1)

wherein R is an alkyl group, and n is an integer;

(2)

wherein R is an alkyl group, and n is an integer;

(3)

wherein R is hydrogen or an alkyl group, and m and n are independently an integer; and (4)

wherein m and n are independently an integer.

17. The water-based pigment ink according to claim 15, wherein the surfactant is contained in an amount ranging from 0.01 to 5.0% by weight based on the total weight of the ink.

18. The water-based pigment ink according to claim 16, wherein the surfactant is contained in an amount ranging from 0.01 to 5.0% by weight based on the total weight of the ink.

19. An ink-jet recording method comprising applying an ink by an ink-jet system to a recording medium to conduct recording, wherein the water-based pigment ink according to any one of claims 1 to 18 is used as said ink.

20. The ink-jet recording method according to claim 19, wherein the ink-jet system is an ink-jet system in which thermal energy is applied to the ink to eject the ink.

21. The ink-jet recording method according to claim 19, wherein the ink-jet system is an ink-jet system in which mechanical energy is applied to the ink to eject the ink.

22. A recording unit comprising an ink container portion with an ink held therein and a head from which the ink is ejected, wherein the water-based pigment ink according to any one of claims 1 to 18 is used as said ink.

23. An ink cartridge comprising an ink container portion with an ink held therein, wherein the water-based pigment ink according to any one of claims 1 to 18 is used as said ink.

24. An ink-jet recording apparatus comprising a recording unit having an ink container portion with an ink held therein and a head from which the ink is ejected, wherein the water-based pigment ink according to any one of claims 1 to 18 is used as said ink.

25. An ink-jet recording apparatus comprising an ink cartridge having an ink container portion with an ink held therein and a head from which the ink is ejected, wherein the water-based pigment ink according to any one of claims 1 to 18 is used as said ink.

26. The ink-jet recording apparatus according to claim 25, which further comprises an ink feeder for feeding the ink contained in the ink cartridge to the head.

27. A method of improving the impact accuracy of an ink ejected, which comprises the step of applying the water-based pigment ink according to any one of claims 1 to 18 to a recording medium by an ink-jet system.

* * * * *